Figure 1:
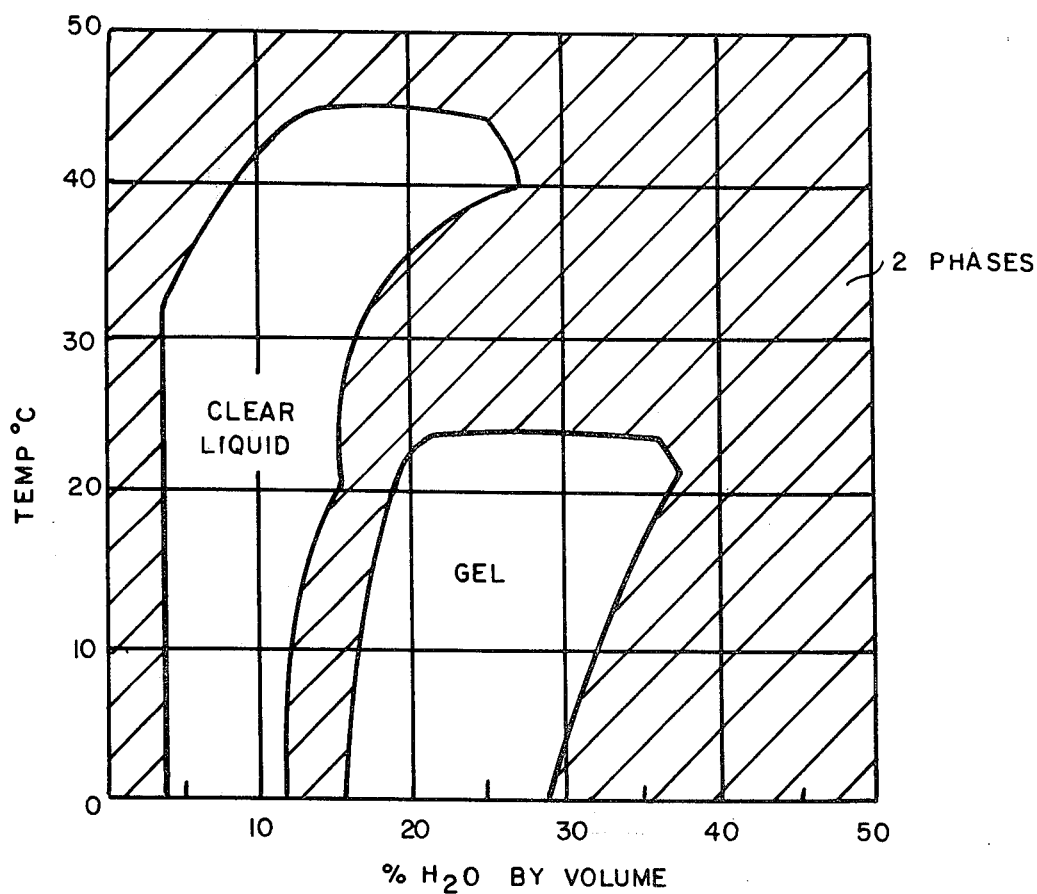

United States Patent [19]

Kauffman

[11] 4,124,527

[45] Nov. 7, 1978

[54] COMPOSITIONS AND PROCESS FOR LIQUID SCINTILLATION COUNTING

[75] Inventor: Joel M. Kauffman, Sharon, Mass.

[73] Assignee: New England Nuclear Corporation, Boston, Mass.

[21] Appl. No.: 640,630

[22] Filed: Dec. 15, 1975

Related U.S. Application Data

[62] Division of Ser. No. 420,633, Nov. 30, 1973, Pat. No. 3,939,094.

[51] Int. Cl.$^2$ ............................................. C09K 3/00
[52] U.S. Cl. ............................... 252/408; 252/301.17; 250/483; 250/484; 424/1
[58] Field of Search .............. 252/408 R, 301.17, 408; 260/488; 250/484, 483; 424/1

[56] References Cited

U.S. PATENT DOCUMENTS

| 2,674,619 | 4/1954 | Lunsted .......................... 252/357 X |
| 2,677,700 | 5/1954 | Jackson et al. .................. 252/357 X |
| 3,939,094 | 2/1976 | Kauffman .................... 252/408 R X |

OTHER PUBLICATIONS

Liberman et al., Int. J. of Applied Radiation and Isotopes, vol. 21, 1970, pp. 319–327.
Wyandotte (I), Data Sheet.
Wyandotte (II), Data Sheet.

*Primary Examiner*—Benjamin R. Padgett
*Assistant Examiner*—Josephine L. Barr
*Attorney, Agent, or Firm*—Sewall P. Bronstein

[57] ABSTRACT

Liquid scintillation counting compositions which include certain polyethoxylated poly(oxypropylene) emulsifiers allow stable dispersion of aqueous or other samples merely by shaking. Preferred are mixtures of such emulsifiers, which give homogeneous, monophasic-appearing dispersions over wide ranges of temperature and aqueous sample content. Certain of these emulsifiers, without being mixed, are of particular advantage when used in analysis of samples obtained through radioimmunoassay techniques, which are extremely difficult to disperse. Certain of these emulsifiers, also without being mixed, uniformly give homogeneous, monophasic appearing aqueous counting samples over much wider ranges of aqueous sample content and temperature than prior sample emulsifiers.

11 Claims, 3 Drawing Figures

COMPOSITIONS AND PROCESS FOR LIQUID SCINTILLATION COUNTING

This is a division of application Ser. No. 420,633 filed Nov. 30, 1973, now U.S. Pat. No. 3,939,094.

BACKGROUND

When a charged atomic or nuclear particle passes through matter, it dissipates its energy in the ionization and excitation of the molecules of the material. This ionization and/or excitation is the basis of all the major instruments used for the detection and measurement of such particles. Similar instruments are also used for the detection of uncharged radiations, which produce secondary charged particles in their passage through matter. X-rays, gamma rays and neutrons are examples of uncharged radiations. The different types of radiation detection instruments can be divided into three categories: dosimeters, track visualization instruments and counters, for example, scintillation counters.

In scintillation counters the fluorescence emission produced in a suitable solid, liquid, or gas by high energy particles, either charged or uncharged, is detected by one or more photomultiplier tubes or other light-sensitive devices. Radiations and particles which scintillation counters are employed to detect include neutrons, X-rays, γ-rays, electrons (beta-rays), positrons, protons, deuterons, tritons, alpha particles, fission fragments, mesons, and other nuclear particles. The scintillation process is the transformation of energy dissipated as ionization and excitation of a substance into fluorescence emission. A substance which performs the entire transformation is called a scintillator, and may be in any state of matter, i.e. solid, liquid or gas.

Both organic and inorganic materials have been employed as scintillators in scintillation counters. The earliest scintillators were inorganic materials such as willemite, barium platinocyanide, brown diamond, and zinc sulfide. A primary disadvantage of the inorganic materials is that they are available only as small crystals and crystalline powders, and thus must be used as multicrystalline screens which are opaque to their own luminescence in thicknesses greater than about 0.1mm. Further, they cannot be used in solutions due to general insolubility.

Many new organic materials have been evaluated for use as scintillators in scintillation counters. Among the more significant improvements is the discovery that organic scintillator solutions can be employed in place of solids, thus obviating the need for large, pure, crystalline blocks. It has further been found that a substance to be tested, for example a material tagged with radioactive material such as carbon-14, can be added directly to the scintillator solution or "cocktail" for measurement.

In recent years, liquid scintillation counting has become a very popular method for the measurement of low energy beta emitters such as $14_C, 35_S$ and $3_H$ (tritium). Liquid scintillation counting (LSC) is commonly accomplished by combining, dissolving, dispersing or solubilizing a radioactive sample to be analyzed in a liquid scintillator so as to form a counting sample. Each radioactive disintegration may lead to the production of a light pulse, and these are counted by suitable equipment, as mentioned above. One measure of success of the analysis is the ability to obtain the same number of counts per unit time from a given sample over a period of time, allowing, of course, for the natural radioactive decay of the material. A measure of sensitivity and utility of the analysis is called the "counting efficiency", which is commonly defined as:

$$\frac{\text{observed counts per unit time} \times 100}{\text{actual disintegrations per unit time}}$$

The common constituents of a liquid scintillator are the solvent and one or more fluors. The solvent is usually an aromatic liquid such as an alkylbenzene. Its purpose is to absorb the energy of excitation due to radioactive disintegrations, and to transfer it to the fluor. The fluor (sometimes called a scintillator solute) converts the transferred energy to electromagnetic radiation. When a fluor does not produce this radiation, or fluorescence light, at the wavelengths of greatest sensitivity of the light measuring device available, a second fluor (sometimes called a wavelength shifter or secondary scintillator solute) may be added. It absorbs the light from the first or primary fluor, and re-emits at longer wavelengths, hopefully matching the sensitivity of the light measuring device, and leading to higher counting efficiency.

However, one of the major drawbacks of the usual aromatic solvents is that they do not permit the counting of aqueous samples in homogeneous media. Most samples of biological interest, and many of environmental interest, are aqueous, and contain salts, proteins and/or saccharides. When such samples are added to a liquid scintillator which is mostly composed of aromatic solvent, an immiscible layer may be formed in the sample container, preventing either accurate or reproducible determination of the radioactive disintegrations. The average range of travel of a beta particle produced from a tritium decomposition is about 1.2 microns in water, and the average range of the beta particle from a $14_C$ decomposition is about 12 microns. Unless the particle can reach the aromatic solvent within such a small distance from the particle's origin in the aqueous phase, no scintillation or count will result from the decomposition.

In order to circumvent this, two approaches have been developed. One was the use of added solvents, such as methanol or dioxane, which are miscible with both water and aromatic solvents. This allowed more accurate counting of aqueous samples in homogeneous solution, provided the samples were sufficiently small and very dilute. There are a number of disadvantages to multiple solvent systems, including (a) the amount of the sample which can be handled is limited; (b) the salt, protein, saccharide or other water-soluble constituent of interest can only be present in limited concentration ranges; (c) the typical added solvent is flammable and volatile; and (d) the typical added solvent, and p-dioxane in particular, is volatile and the vapors are toxic. The second approach was the use of surface active substances or emulsifiers, so that the aqueous sample in the counting container was actually present either in a solution (colloidal or true), dispersion or emulsion of a multitude of suitable small micelles. Compositions consisting of fluors, alkylbenzene solvents and ethoxylated alkylphenol detergents such as the Triton-type detergents available from Rohm and Haas, have been widely accepted for measurement of aqueous samples. Their disadvantages include limitations on the amount of aqueous sample accomodatable in the cocktail, and difficultly predictable effects of temperature on sample solubility or dispersability. See D. I. Chapman and J.

Marcroft, 22 *Int. J. Appl. Radiat. Isotopes* 371 (1971). A further disadvantage is the difficulty in predicting the effect of time on the sample stability. Another problem is the influence of the mode of preparation on the counting efficiency. It has been stated by Chapman et al and others that warming the sample and the above scintillator to 40° C., thorough mixing, then slow cooling without further mixing are necessary for reproducible results. This type of system is described elsewhere, such as in U.S. Pat. No. 3,573,218, issued Mar. 30, 1971, to R. H. Benson, and in the article by R. I. Lieberman and A. A. Moghissi, 21 *Int. J. Appl. Radiat. Isotopes* 319 (1970) and references cited therein. With all of the reported examples of this system, sample capacity varies greatly with temperature and also varies objectionably with time.

Another problem with prior art emulsifier cocktails as described in the literature or available in the market is their tendency to show spurious counts due to phosphorescence when the counting sample is prepared in daylight or under fluorescent lighting. This is thought to be due to impurities in the emulsifiers. It requires long and undesirable waits before counting is begun.

Of the analytical systems which utilize scintillation counting of aqueous samples, the most demanding with regard to sample solubility in the scintillation cocktail are those which may be categorized as radioimmunoassay techniques, such as those reviewed in some detail in D. S. Skelley et al., "Radioimmunoassay," 19 *Clinical Chemistry* 146 (1973). Radioimmunoassay is a currently unsurpassed method for ultramicroanalysis of components of biological materials. Generally, it involves the analysis of a serum which contains an antibody, or other material having chemically specific binding sites, with a radioactively-tagged antigen or other liquid which becomes bound to the binding sites of the material to be analyzed. The mixture is aged or "incubated" for a time sufficient for such binding to occur, and the excess antigen or liquid is separated from the material to be analyzed. That material is mixed in a scintillation cocktail, and subjected to scintillation counting. Comparison of counting results with suitable controls or standards allows one to accurately determine very minute amounts of materials in biological samples. For example, tiny amounts of human plasma, urine or serum may be tested using radioimmunoassay techniques for levels of digoxin, digitoxin, angiotensin, steroids, and many other materials. A large number of kits for radioimmunoassay testing for such materials are commercially available, such as the Digoxin [$^3$H] Radioimmunoassay Kit, made by New England Nuclear Corp., the Schwarz/Mann Angiotensin-$^{125}$I Kit, made by the Schwarz/Mann Division of Becton Dickinson Corporation, and the NEN General Steroids Pak, also made by New England Nuclear Corp. As will be understood in the art, the term "radioimmunoassay" (hereafter RIA) as used herein is not intended to be restricted to analyses involving antibodies and antigens but includes competitive binding processes in general, including what Skelley et al., supra refer to as "competitive protein binding analysis," etc.

RIA presents the most difficult test of scintillator detergents or emulsifiers, because RIA samples contain one or more substances which cause formation of non-homogeneous mixtures with prior art liquid scintillators, such as inorganic phosphate or other salts or buffers, human serum or bovine serum albumin. In particular, liquid scintillators containing 25 to 50% by volume of ethoxylated nonylphenols, which includes the Triton-type emulsifiers, fail to form homogeneous solutions or even uniform solubilized microemulsions with normal levels of RIA samples. Instead sediment up to 3mm high appears when 1 to 2ml of common RIA samples are added to typical amounts, e.g. 10 to 15 ml, of liquid scintillator cocktails containing alkylphenol derivatives and other types of emulsifiers. At other times, complete separation of liquid phases and/or precipitation of crystalline solids occurs, rendering the previous LSC techniques useless or of doubtful accuracy for the counting of RIA samples. A further problem with prior art emulsifier cocktails is in determining the counting efficiency on an automated basis, which is specially desirable when RIA samples in great number are to be counted. The use of the automatic external standard built into many commercial liquid scintillation instruments has been reported to be inaccurate when these emulsifier cocktails are used at not-always-predictable levels of aqueous sample. These problems often become apparent only after the counting sample has been kept for several hours, and often only when the counting temperature differs from the preparation temperature.

Thus it can be seen that many difficulties have existed with regard to previous aqueous scintillation cocktails, and that these difficulties became magnified and others arose when attempts were made to use previous scintillation cocktail formulations on complex aqueous samples such as those obtained in radioimmunoassay analysis.

It is therefore an object of the present invention to provide improved liquid scintillators for scintillation counting which will permit the measurement of counting samples having a relatively large proportion of water with greater precision and accuracy than before possible. It is a further object to provide compositions for LSC which are insensitive to the order or manner of addition of the sample. It is a further object to provide compositions for LSC which, when used with aqueous samples, will result in a liquid whose appearance is that of a homogeneous solution, or a similarly appearing microemulsion or dispersion. It is a further object to provide compositions for LSC whose ability to contain large aqueous samples in homogeneous-appearing solution is relatively independent of temperature over the common range of 0°-30° C. It is a further object to provide compositions for LSC whose water miscibility does not vary substantially throughout the entire range of its water holding capacity, obviating reference to and allowance for complicated phase diagrams. It is a further object to provide compositions for LSC whose flammability, volatility, odor, and vapor toxicity are unusually low. It is a further object to provide compositions for LSC allowing all methods for determination of LSC efficiency to be applied conveniently and accurately. It is a further object to provide a process for the preparation of an LSC sample whereby the material to be analyzed is sufficiently dispersed or dissolved merely by shaking the constituents at ordinary room temperatures of 15°-35° C. It is a further object to provide compositions for LSC that dissolve or solubilize into stable solutions or uniform microemulsions any or all of the following: RIA samples for determination of steroidal hormones, other RIA samples of diverse types, inorganic salts including alkali metal phosphates, human and other serums, and blood fractions, including bovine serum albumin and many other samples of interest. It is a still further object of this invention to provide a composition for LSC exhibiting little or no light-induced phosphorescence, permitting counting of the sample accurately an unusually short time after preparation. It is a still further object to provide compositions for LSC showing unusually high counting efficiency as defined above for large, aqueous samples, particularly for the isotopes $^3H$ and $^{125}I$, but not limited to these.

Other objects and advantages of this invention will be apparent to those skilled in the art from a consideration of this description of the invention.

Briefly, the present invention involves the use of certain emulsifiers, or combinations of emulsifiers, in scintillation cocktails which are useful and highly efficient with large varieties and sizes of aqueous samples over a wide range of temperatures. Such emulsifiers are generally block polymers of the following structural formula:

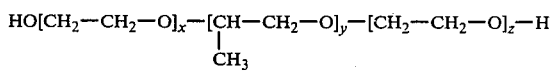

These block polymers comprise a hydrophobic center chain of oxypropylene links, prepared by adding propylene oxide to the two hydroxyl groups of a propylene glycol nucleus, with both ends of the central chain terminating in hydrophilic poly (oxyethylene) groups. The method of making these polymers is disclosed, for example, in U.S. Pat. No. 2,674,619. The hydrophobic central chain can be made to any controlled length varying from about 800 to three or four thousands in molecular weight. The hydrophilic poly(oxyethylene) end groups are controlled in length to constitute from about 10% to 80% by weight of the final molecule. The most useful members of this group of copolymers have a poly(oxypropylene) chain length corresponding to a $y$ value of about 15 to 56, and poly(oxyethylene) chain lengths corresponding to $x$ and $z$ values of between 1 and 35.

The fluors used in the present invention are those which are well known in the art. One or more fluors may be used in a particular composition. The compositions may or may not contain for some purposes a neutron-capture solute or a gamma-capture solute. The fluors need only be present in amounts sufficient to enable the compositions of the present invention to be useful as liquid scintillators. The optimum results will vary depending on the nature of the fluor chosen, the composition of the cocktail, and the nature of the other ingredients. The primary fluor will generally be present in amounts of from about 1 to 100 grams per liter, preferably from 3 to 6 grams per liter. The secondary fluor, if used, will be present at 0.05 to 10 grams per liter, the preferred amounts being between 0.1 to 1 gram per liter. The preferred primary fluor is 2,5-diphenyloxazole (PPO). Other oxazoles, oxadiazoles, such as 2-(4-biphenylyl)-5-phenyl-1,3,4-oxadiazole (PBD), and other known fluors such as p-terphenyl make suitable primary fluors or scintillation solutes. Suitable secondary solutes are also known, including 1,4-bis-(o-methylstyryl) benzene (Bis-MSB), 1,4-bis-[2-(5-phenyloxazolyl)] benzene (POPOP), p-bis-[2-(5-1-naphthyloxazolyl)] benzene (alpha-NOPON), 1,6-diphenyl-1,3,5-hexatriene (DPH), and 2-(1-naphthyl)-5-phenyloxazole (alpha-NPO). The preferred secondary solute is Bis-MSB.

The solvents which are useful in preparing the compositions of the present invention are the liquid aromatic hydrocarbons, preferably those containing from about 6 to 12, preferably from about 6 to 10 carbon atoms. These include benzene, toluene, o-, m- and p-xylenes, 1,2,4 - and 1,3,5-trimethylbenzene, any of the ethylmethyl benzenes, and mixtures of any of the above. The preferred solvents in the present invention are the dimethyl- and trimethylbenzenes, singly or mixed, the most preferred being 1,2,4-trimethylbenzene. The solvent may generally comprise about 20 to about 90% by volume of the LSC composition, preferably about 40% to about 70% by volume.

In Lieberman and Moghissi, 21 *Int. J. Applied Radiat. Isotopes* 319 (1970) (hereafter Lieberman), evaluations were made of a number of surface active agents, including five agents having the polyethoxylated poly(oxypropylene) structure depicted above, in low level counting of tritiated water. It was determined in that study that those five agents were inferior to other known surface active agents for use in LSC, both in counting efficiency and in ability to emulsify large amounts of water. The alkyl phenyl polyethylene glycol ether (ethoxylated alkylphenol) types of detergent, such as Triton N-101 and Triton X-100, both from Rohm and Haas Co., were reported as superior to those polyethoxylated poly(oxypropylene) agents tested. Only certain of the polyethoxylated poly(oxypropylene) agents available were tested, in a simple system involving pure tritiated water. Further, the reported results concerning the capability of emulsifying higher water concentrations dealt with water concentrations of 30-50%. At such high concentrations the LSC compositions are set up as a gel, which is undesirable in many respects, as compared to transparent, apparently monophasic liquids, which are far more preferable for handling and testing, and are not so apt to form two phases in storage.

In accordance with one aspect of the present invention, it has been found that both the counting efficiency and water emulsification are substantially improved when mixtures of certain polyethoxylated poly(oxypropylene) emulsifiers are used in scintillation cocktails, as compared with emulsifiers used or suggested in the past, including the polyethoxylated poly(oxypropylene) emulsifiers tested singly by Lieberman. In accordance with another aspect of the present invention, it has been found that certain polyethoxylated poly(oxypropylene) emulsifiers used singly, including some of those tested by Lieberman, are functional and give thoroughly dispersed cocktails having a monophasic appearance over wide ranges of temperature and aqueous sample content, when used in scintillation counting of RIA samples, which the art would have expected that those emulsifiers would have been unsuitable for, especially in view of the results reported by Lieberman. In accordance with still another aspect of the present invention, it has been found that certain polyethoxylated poly(oxypropylene) emulsifiers used singly are superior to the polyethoxylated poly(oxypropylene) emulsifiers tested by Lieberman, and are suitable for both liquid scintillation counting in general and for RIA techniques.

Contrary to the implication of the Lieberman article that the polyethoxylated poly(oxypropylene) agents are not suitable as LSC emulsifiers, it has been found that mixtures of different polyethoxylated poly(oxypropylene) agents of the formula depicted above, having a $y$ value of from about 15 to 56, preferably from about 18 to about 40, and having $x$ and $z$ values of from about 1 to about 30, preferably constituting from about 10 to about 30 percent by weight of the total molecule, exhibit counting efficiencies, emulsifying properties and other characteristics which are far superior to previous LSC emulsifiers. Preferably such mixtures include one agent having a relatively large number of oxypropylene groups in its center chain, e.g. from about 30 to 56, preferably from 32 to 40, and another agent having relatively fewer of such groups, e.g. from 15 to 30, preferably from 18 to 28, oxypropylene groups.

Such mixtures result in aqueous LSC cocktails which are clear liquids over a broad range of water concentrations and temperatures. This can be easily appreciated by comparing FIG. 1, which is a phase diagram of typical LSC cocktails containing a prior art alkyl phenyl polyethylene glycol ether (ethoxylated alkylphenol) type emulsifier (Triton X-100, Rohm and Haas Co., see Example V infra) with FIG. 2, which is a phase diagram of LSC cocktails containing a mixture of polyethoxylated poly(oxypropylene) emulsifiers in accordance with the present invention (see Example VI, infra). Note that at most suitable counting temperatures, i.e. from about 0° C. to about 30° C., the incorporation of more than 12 to 17% water in the Triton X-100 cocktail will result in a two phase system or a gel which will eventually revert to a two phase system. Close temperature control must be maintained from the time the sample is made up until the desired measurements are made, or the sample may separate into two phases. Prolonged storage of samples containing above 12 to 17% water is very difficult. Measurements using such systems often involve trial and error, with samples having to be remade and often stored and equilibrated for a substantial time prior to measurement because the original sample underwent phase separation.

By contrast, the LSC cocktails containing the mixtures of polyethoxylated poly(oxypropylene) in accordance with the present invention exhibit very little phase sensitivity to either water content or temperature, over the normal counting temperature range. Thus such cocktails can be made up at near their maximum water content at any temperature between about 0° and 30° C. and be measured at any desired temperature, with little fear that phase separation will occur. Nor is close temperature control between make-up and measurement critical from the standpoint of phase separation. Nor is the analyst faced with the use of a solid gel which will eventually undergo phase separation, rather than a clear homogeneous liquid. In fact, no phase change occurs with most cocktails of the present invention even after prolonged storage for weeks or months. These cocktails have other advantage, one being the very low luminescence or phosphorescence they exhibit. This property minimizes false counts caused by ambient lighting to which the cocktail is exposed during mixing. Minimization of the cocktail phosphorescence means shorter equilibration times can be used between the time the cocktail is made up and the time when it is measured. These cocktails are particularly advantageous when large numbers of samples are to be analyzed automatically. All of the samples made in accordance with this invention can be placed in the automatic sample holder shortly after mixing. Since the initial phosphorescence is low and decreases rapidly and the cocktail stays stable for so long, those samples which reach the counter within 1 hour will be truly comparable with those samples which reach the counter after 18 or 20 hours. Thereafter the samples can normally be stored for up to four months and still the counts on each sample will be repeatable, allowing for natural radioactive decay.

These advantages which are obtained over prior art cocktails in liquid scintillation counting in general are even more strikingly observed and of even greater benefit in analyzing samples obtained by radioimmunoassay techniques. There the volume of the sample which is obtained after separation of the bound from the unbound ligands or antigens varies from sample to sample. The accuracy of the analysis improves significantly if larger sample sizes can be measured, and thus it is preferable to add all of the RIA sample to the cocktail, no matter how much is obtained. Also, as a practical matter, it is preferable not to have to precisely measure out each sample for addition to the cocktail, especially where large numbers of samples are being analyzed. Yet even with the best of prior art emulsifiers, i.e., those which could hold some amounts of RIA samples for a period without phase separation, there are severe limits on the RIA sample size which can be accomodated, as well as strict temperature limitations. Scintillation cocktails containing the mixed polyethoxylated poly(oxypropylene) emulsifiers of the present invention do not form separate phases over wide ranges of aqueous RIA sample content and temperature. Thus the present invention effectively eliminates the need for strict controls on RIA sample size and temperature.

While it is therefore preferred that a mixture of polyethoxylated poly(oxypropylene) agents be used as the surface active agents, it has also been found that certain of the materials having that structure, without being admixed with other polyethoxylated poly(oxypropylene) agents, are of particular advantage in RIA analyses. Lieberman tested several polyethoxylated poly(oxypropylene) agents singly for use in LSC, namely five materials sold under the name Pluronic by BASF Wyandotte Corp.: Pluronic L35 (average number of oxypropylene groups 16.4, 50% poly(oxyethylene) in total molecule); Pluronic L61 (30 oxypropylene groups, 10% poly(oxyethylene)); Pluronic L62 (30 oxypropylene groups, 20% poly(oxyethylene)); Pluronic L92 (47.4 oxypropylene groups, 20% poly(oxyethylene)); and Pluronic L121 (69 oxypropylene groups, 10% poly(oxyethylene)). The Lieberman testing system was a simple one in which the aqueous portion of the cocktail was pure tritiated water. Lieberman concluded that none of the polyethoxylated poly(oxypropylene) detergents were suitable or comparable to other known LSC emulsifiers.

It has now been found that polyethoxylated poly(oxypropylene) containing from about 18 to about 50 oxypropylene units in the center chain and from about 10 to about 30% by weight oxyethylene units in the total molecule are suitable LSC emulsifiers for radioimmunoassay samples which contain buffers and plasma and/or human or other serum. This range includes several materials tested and found lacking in Lieberman's tritiated water system, i.e., Pluronic L61, Pluronic L62, and Pluronic L92. Why such materials might be unsuitable for simple systems such as tritiated water and yet show advantages over known emulsifiers in the more difficult RIA sample systems is not essentially known. It also includes a number of other commercially available polyethoxylated poly(oxypropylene) detergents, such as Pluronic L42 (the average number of oxypropylene groups 20, 20% poly (oxyethylene) in the total molecule) and Pluronic L72 (35 oxypropylene groups, 20% poly(oxyethylene)) both also available from BASF Wyandotte Corp.. Although not nearly as effective as the above-described mixed polyethoxylated poly(oxypropylene) emulsifier system, the above unmixed emulsifiers show considerably more flexibility than prior emulsifiers, with regard to the holding capacity for the RIA sample. The term "unmixed" is used here to differentiate over the above - described "mixed" polyethoxylated poly (oxypropylene) embodiments, and is not intended to exclude added amounts of previously known emulsifiers, such as the ethoxylated alkylphenols and other emulsifiers mentioned earlier. In fact, addition of such emulsifiers appears to enhance the flexibility of these "unmixed" polyethoxylated poly(oxypropylene) emulsifiers in RIA analysis.

Moreover, within the range of molecular structure of the "unmixed" polyethoxylated poly(oxypropylene) emulsifiers disclosed above it has been found that certain materials other than those tested by Lieberman are suitable for liquid scintillation counting in general as well as for RIA. In this regard, polyethoxylated poly(oxypropylene) materials having from about 32 to about 40 oxypropylene groups and comprising about 10 to 30% poly(oxyethylene) are superior to the other compounds of the same formula and to other surface active agents of the prior art. Also superior, although not as strikingly so are similar materials containing about 18 to about 25 poly (oxypropylene) units. The preferred compound is Pluronic L72, with Pluronic L42 being somewhat less preferred. These compounds share the advantages of the mixture of poly(oxyethylene) poly(oxypropylene) surface active agents, albeit not to the same degree. Both Pluronic L72 and Pluronic L42, for example, are superior in aqueous sample holding capacity to Pluronic L62. They too are particularly useful with regard to RIA counting. Again, emulsifiers within these ranges may be used to advantage in combination with other types of known emulsifiers or detergents.

Another class of Pluronics exist, e.g. Pluronic 10R5 and Pluronic 25R2, also by Wyandotte Corp., which may be called "reverse Pluronics," since their structure is the reverse of that depicted above. That is, they have a hydrophilic central chain of poly(oxyethylene) units and hydrophobic end groups of poly(oxypropylene) units. These may also be used, alone or admixed, but they do not perform nearly as well as the emulsifiers discussed above.

As will be appreciated by those skilled in the art, any of the compositions of the present invention may be used to advantage in some circumstances in combination with multiple solvent systems.

The invention will be further clarified with reference to the following illustrative embodiments. All samples are observed at the given temperature at least overnight before observations of physical state are recorded. All percentages given are by volume unless otherwise indicated.

EXAMPLE I

A composition without fluors but otherwise that of a liquid scintillator is prepared by blending together to form a colorless liquid 50% by volume a polyethoxylated poly(oxypropylene) copolymer of the average structure described and depicted above where $y=30$ and $x=z=5$ (Pluronic L62, by BASF Wyandotte Corp.), and 50% by volume 1,2,4-trimethylbenzene.

EXAMPLE II

A composition without fluors but otherwise that of a liquid scintillator is prepared by blending together to form a colorless liquid 30% by volume a copolymer of the average structure depicted above where $y=35$ and $x=z=5.8$ (Pluronic L72), 20% by volume of a copolymer of that structure but where $y=20.7$ and $x=z=3.4$ (Pluronic L42) and 50% by volume 1,2,4-trimethylbenzene.

EXAMPLE III

An LSC composition without fluors but otherwise that of a liquid scintillator is prepared by blending together to form a colorless liquid 40% by volume an ethoxylated nonylphenol of the following average structure (Tergitol NPX, Union Carbide Co.):

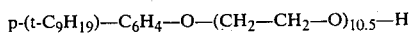

30% by volume p-xylene and 30% by volume 1,2,4-trimethylbenzene.

EXAMPLE IV

A radioimmunoassay sample representing all but the radioactivity in a Digoxin [$^3$H] Radioimmunoassay Kit from New England Nuclear Corp. is prepared by blending several of the components of that kit. The mixture is made from 7 parts by volume of the buffer concentrate, 2 parts by volume of the diluent used in the kit's charcoal suspension (i.e., equivalent to the charcoal suspension supplied with the kit without the charcoal), and 1 part by volume of normal human serum, all of which are aqueous solutions or dispersions. In addition to normal human serum the mixture contains bovine serum albumin and sodium dihydrogen phosphate buffer from the buffer concentrate and charcoal diluent solutions and other materials.

Samples are prepared by shaking 0.90 ml. of the above mixture with 10.0 ml. of the LSC compositions of Examples I, II, and III. The samples are left undisturbed at 24° C. for 20 hours, and then observed. Ideally, a homogeneous, transparent to faintly translucent liquid solution is desired. Separation of solid or liquid constituents is undesirable because one does not know whether any of the radioactivity potentially present in an actual, equivalent sample will fail to be counted accurately. The samples are also observed after being kept at a constant 5° C. and 18 hours. These two temperatures of 24° and 5° C. represent the most common actual conditions of use for mixtures of LSC compositions. The observations are shown in Table I.

Table I

| Appearance on Keeping Radioimmunoassay Samples in Various LSC Compositions | | | |
|---|---|---|---|
| LSC Composition | Water Added | 24°/20 hours | 5°/18 hours |
| Example I | — | homogeneous, transparent soln. | homogeneous, transparent soln. |
| Example II | — | homogeneous, transparent soln. | homogeneous, transparent soln. |
| Example III | — | Ppt. 3mm in depth | Hazy soln. |
| Example III | 0.9ml* | homogeneous, transparent soln. | Sepn. of 2nd liquid phase |

*It is known that dilutions of water solutions of polar materials with additional water will often allow the diluted sample to be dissolved in the LSC composition; this is tried here in order to avoid the precipitate obtained from Example III.

EXAMPLE V

An LSC composition representing a cocktail commonly used by those skilled in the art is prepared by blending together to form a clear, pale yellow, blue-fluorescent liquid 33.3% by volume an ethoxylated octylphenol of the following average structure (Triton X-100, Rohm and Haas Co.):

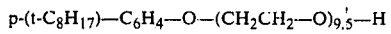

p-(t-C$_8$H$_{17}$)—C$_6$H$_4$—O—(CH$_2$CH$_2$—O)$_{9.5}$—H with 66.7% by volume of toluene, 5.55g/liter of PPO and 0.12g/liter of Bis-MSB.

Varying percentages of water are shaken manually with the cocktail until further shaking produced no visible change in appearance of the mixture. The mixtures are kept in a controlled temperature bath for several hours, shaken again, and kept 18 hours at the same temperature. The physical appearance is plotted as FIG. 1, attached. Note that the water levels from 0–4% are not practically usable in the LSC because the mixture separates into two liquid phases. At the common instrumental counting temperature of 5° C., the water levels from 11–16% are not usable, and at the common counting temperature of 24° C., water levels from 15–20% are not usable, because of phase separation. Up to 24° C., gels are formed with water levels above 15–20%. These gels become two phases after standing for several days at 20° C.

EXAMPLE VI

An LSC composition is prepared by blending together to form a clear, pale yellow, blue-fluorescent liquid 24% by volume of a polyethoxylated poly(oxypropylene) copolymer of the average structure described and depicted above, where $y=35$ and $x=z=5.8$ (Pluronic L72), 24% by volume of a copolymer of similar structure where $y=20.7$ and $x=z=3.4$ (Pluronic L42), 52% by volume 1,2,4-trimethylbenzene, 0.50g/liter of Bis-MSB and 4.00g/liter of PPO.

Figure 2:
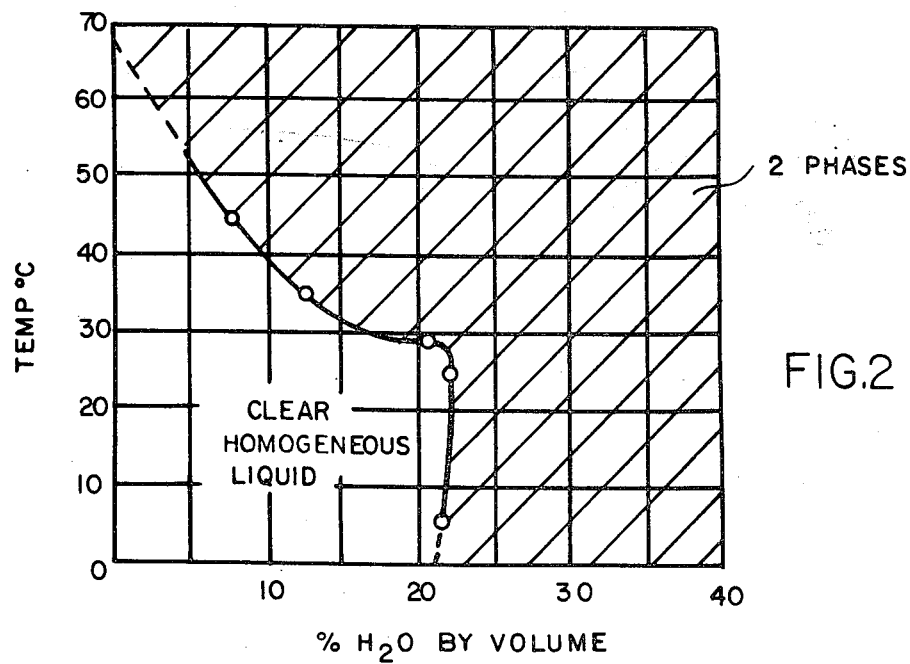

The behavior of the composition with water on keeping at various temperatures for 18–24 hours in the manner described in Example V is noted and plotted as FIG. 2, attached. Observe that the water levels from 0–20% are usable for this LSC in the temperature range of 0–29° C., and that the various mixtures with water are apparently free from large regions of biphasic nature.

EXAMPLE VII

An LSC composition is prepared by blending together to form a clear, pale yellow, blue-fluorescent liquid 50% by volume of a copolymer of the average structure described and depicted above wherein $y=30$ and $x=z=5$ (pluronic L62), with 50% by volume of 1,2,4-trimethylbenzene, in which is mixed 0.50g/liter of Bis-MSB and 5.00g/liter of PPO.

Addition of incremental amounts of water and allowing to stand as in example VII, results in a clear, apparently monophasic liquid over a range of from 0–12.5% water over a temperature range of from about 5° C. to about 25° C. Above 12.5% water the mixture separated into two phases on keeping. At from about 30 to about 50% water levels, a translucent gel is formed.

EXAMPLE VIII

An LSC composition is prepared by blending together 100 ml. of a polyethoxylated poly(oxypropylene) of the average structure depicted above where $y=20.7$ and $x=z=3.4$ (Pluronic L42), 100 ml of 1,2,4-trimethylbenzene, 1 gram of PPO, and 0.1g of Bis-MSB. This composition was a clear liquid at 0%,5%,10%,15%, and 20% water. At 25% water level, a two phase system was obtained.

EXAMPLE IX

An LSC composition is prepared by blending together 100 ml. of a polyethoxylated poly(oxypropylene) of the average structure depicted above where $y=35$ and $x=z=5.8$ (Pluronic L72), 100 ml of 1,2,4-trimethylbenzene, 1 g. PPO and 0.1 g. Bis-MSB. This composition was a clear liquid at 0%,5%, 10%,15%, and 20% water. At the level of 25% water a clear gel was formed.

EXAMPLE X

The LSC compositions in Examples V, VI, VII, VIII, and IX are tested for LSC efficiency by the method generally acknowledged by those skilled in the art to be most accurate, that of internal standardization. The isotope used is $^3$H, and the form is $^3$HHO. The counting temperature is 5°–12° C., and the instruments used are Packard Tri-Carb 3320's, made by Packard Instruments Co., operated to best advantage for each mixture. Efficiencies vary from instrument to instrument, and depend upon the settings of all the counting parameters on the instrument. The Packard Tri-Carb 3320 is a typical, current instrument, which is capable of counting a sealed, unquenched, tritium standard at about 60% efficiency. The results are shown in Table II.

Table II

| | Tritium Counting Efficiencies of LSC Compositions | | | | |
|---|---|---|---|---|---|
| Water in Sample | LSC Comp. of Ex V | LSC Comp. of Ex VI | LSC Comp. of Ex VII | LSC Comp. of Ex VIII | LSC Comp. of Ex IX |
| none | 41% | 40% | 40% | 36% | 35% |
| 5% | 34% | 35% | 35% | 31% | 32% |
| 10% | 32% | 33% | 33% | 28% | 31% |
| 15% | Phase sep. | 32% | Phase sep. | 27% | 29% |
| 20% | Phase sep. | 30% | Phase sep. | 23% | 23% |

Measurements made using the same techniques give a 33% counting efficiency for 10ml of the LSC composition of Example VI when mixed with 0.9ml of the RIA sample of Example IV, and 33% counting efficiency for 10ml of the LSC composition of Example VIII when mixed with 0.9ml of the RIA sample of Example IV.

EXAMPLE XI

In many cases the aqueous samples for liquid scintillation counting can only be obtained in rather small volume, such as those obtained from a Packard 305 oxidizer, made by Packard Instruments, Inc. Some systems produce aqueous sample of only 0.2 to 0.3 while other systems put out samples of from about 0.8 to 1.0 ml. In analyzing these smaller aqueous samples, it is desirable to use high efficiency LSC compositions having lower emulsifier content. It is particularly desirable to have a single LSC composition which would handle both the 0.2 to 0.3 range and the 0.8 to 1.0 range of aqueous samples interchangeably. In order to demonstrate that the mixtures of the present invention can be used to handle both low ranges of aqueous sample with higher efficiency than previously attainable, an LSC composition containing lower amounts of the emulsifiers of Example VI was prepared by blending 17% by volume of Pluronic L72, 17% by volume Pluronic L42, and 66% by volume 1,2,4-trimethylbenzene, with 0.50g/liter of Bis-MSB and 5.00g/liter of PPO. At this low emulsifying level, phase observations with incremental amounts of water disclosed a range between about 0.6% and 1.1% water mixed with the above composition within which a two phase, rather than a single homogeneous phase liquid resulted. However, this problem was solved by adding 12.0 grams of water per liter to the above composition and thereafter treating this water-augmented liquid as the base LSC composition. The efficiencies measured for this water-augmented LSC composition for 0%, 5%, and 9.1% aqueous samples, are reported in Table III as LSC composition XI-A. With this water-augmented LSC composition, no biphasic ranges between about 0% and 9.1% are observed. Of course, if one could be sure that all of the aqueous samples to be tested would be above or below the 0.6 to 1.1% range, the water augmentation would not be necessary in order to avoid phase separation, and in that case the efficiencies obtained from the mixtures of the present invention would even be slightly higher. However, in the interest of having an LSC composition which can handle this entire range of low level aqueous sample content, the slight loss in efficiency caused by water augmentation can be tolerated.

For comparison, an LSC composition is chosen which is believed to be the most efficient of prior LSC systems for this range of aqueous sample levels. It is prepared by blending together 250ml of an ethoxylated dodecylphenol of the following average structure (Tergitol 12P-9, Union Carbide):

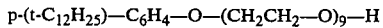

p-(t-$C_{12}H_{25}$)—$C_6H_4$—O—($CH_2CH_2$—O)$_9$—H with 650 ml of 1,2,4-trimethylbenzene, 100g of naphthalene, 3.92g of PPO and 0.08g of Bis-MSB. This LSC composition is designated as LSC composition XI-B in Table III.

Figure 3:
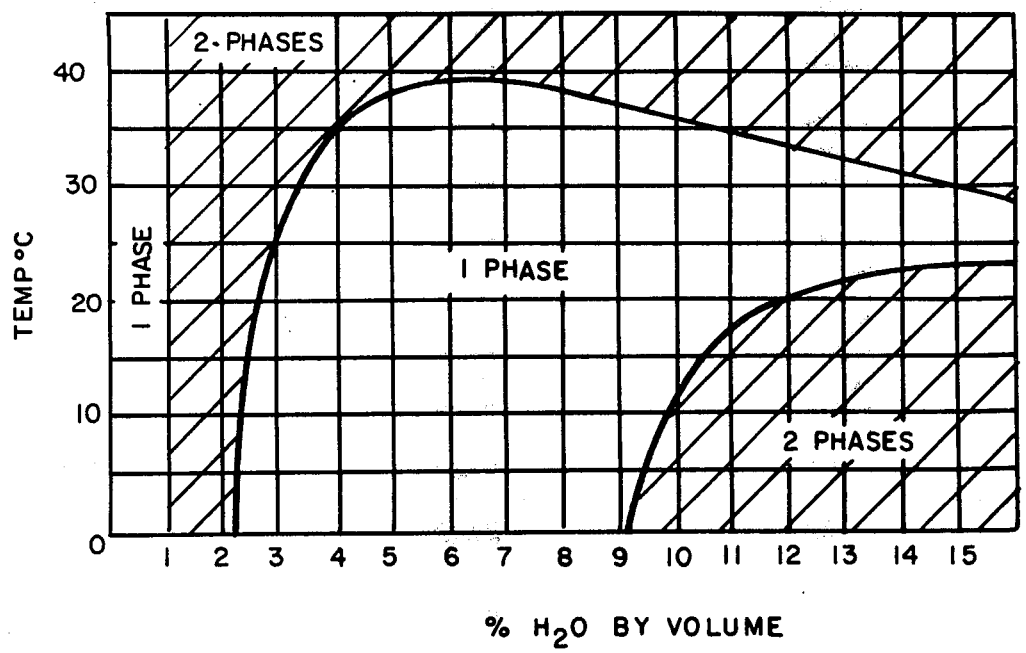

The behavior of this composition with water on keeping at various temperatures for 18–24 hours is shown in FIG. 3. Observe that water levels are usable at 23° C. from 0–0.9% water, not usable from about 0.9–2.9% water, then usable again from 2.9–13.5% water. Further observe that mixtures prepared with water at the common room temperatures of 20°–30° C. become biphasic on keeping in LSC instruments at the common instrumental temperature of 5° C., 10° C., and 12.5° C. These phase anomalies are not curable by water augmentation, as can be done with the LSC mixtures with which the comparison is made. The counting efficiencies are given in Table III, and were determined in the same manner as those reported in Table II.

Table III

| Tritium Counting Efficiencies for Low Aqueous Sample Levels | | |
|---|---|---|
| Water in Sample | LSC Comp. XI-A | LSC Comp. XI-B |
| none | 41% | 41% |
| 5.0% | 39% | 37% |
| 9.1% | 36% | 34% |

In addition to having higher counting efficiencies and being monophasic throughout the range of 0–9.1% water, the water augmented LSC composition XI-A does not require the presence of naphthalene, which makes LSC composition XI-B rather pungent, and thus composition XI-A is more comfortably handled in LSC analysis.

EXAMPLE XII

The LSC composition in Examples VI, XI-A, and XI-B are tested for luminescence or phosphorescence (which, if present would lead to false counts) on the Packard 3320 counters by irradiation of 10ml volumes of triplicate samples of each composition under standard conditions of container, geometry, temperature and time, by means of a mercury vapor lamp. This is intended to simulate the mixing of an LSC sample in strong fluorescent light or incident sunlight, a procedure known to give false counts due to phosphorescence and not radioactivity. The fewer counts obtained under these standard conditions, when the samples are counted as though they contained tritium, the better. The results are reported in Table IV.

Table IV

| Counts per Minute Observed in Uniform Test of Ultraviolet-Light-Induced Luminescence | |
|---|---|
| LSC Composition of Example VI: | mean value ~650cpm |
| LSC Composition of Example XI-A: | mean value 100cpm |
| LSC Composition of Example XI-B | mean value 1400cpm |

In sum, it has been found that LSC compositions containing polyethoxylated poly(oxypropylene) emulsifiers, taken singly, which have from about 18 to 28 oxypropylene groups per chain or from about 32 to 40 oxypropylene groups per chain, and which have a chain content of poly(oxyethylene) of from about 10% to 30% of their poly (oxypropylene) content, accomodate large amounts of aqueous sample over wide temperature ranges to give homogeneous, apparently monophasic liquids which are suitable for liquid scintillation counting. This is particularly surprising in view of the fact that a material of the same structure but having an oxypropylene chain length between the two ranges (Pluronic L62 is) much more limited in its aqueous sample holding capacity. It has further been found that emulsifiers of the same structure and having an oxypropylene chain length of from about 18 to about 50, taken singly, are consistently successful in dispersing samples from radioimmunoassay or other competitive binding analyses to form homogeneous liquids which are suitable for scintillation counting whereas prior emulsifiers were unsuccessful. It has further been found that mixtures of emulsifiers having the same structural formula with from about 15 to 56 oxypropylene units per chain and a chain content from about 1 to about 30 oxyethylene units are even better than the above groups of those emulsifiers in ability to homogeneously disperse aqueous samples including RIA and other samples, in having increased counting efficiencies, and in other ways.

While a number of embodiments have been described with particularity, other embodiments, uses and advantages will be apparent to those skilled in the art from this disclosure. It is intended that the present disclosure be merely exemplary and not limiting, and the scope and spirit of the invention is indicated by the following claims.

I claim:

1. A liquid scintillation counting composition, comprising a radioimmunoassay sample and a material having the following structural formula:

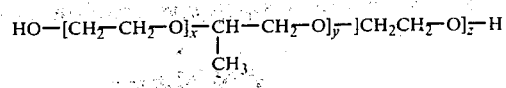

in which y is from about 18 to about 50, and x and z are such that the total [CH$_2$—CH$_2$—O] content is from about 10% to 30% by weight of the molecule.

2. The composition of claim 1, in which the radioimmunoassay sample comprises inorganic salts and an animal blood fraction.

3. The composition of claim 1, further comprising at least one organic solvent.

4. The composition of claim 3, further comprising a scintillating solute.

5. The composition of claim 4, in which y is about 35.

6. The composition of claim 4, in which y is about 20.

7. A method of liquid scintillation counting comprising mixing a radioimmunoassay sample to be analyzed with a liquid scintillation composition comprising a mixture of a first material having the following structural formula:

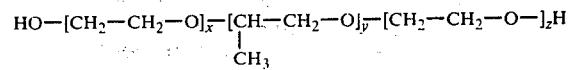

in which y is from about 15 to 56 and x and z are from about 1 to about 35, and a second material having the following structural formula:

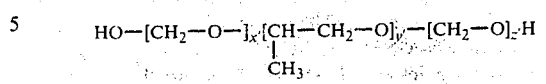

in which y' is from about 15 to about 56 and x' and z' are from about 1 to 35, and exposing the liquid scintillation composition to a scintillation counter.

8. A method of analyzing radioimmunoassay samples, comprising mixing the radioimmunoassay sample to be analyzed with a liquid scintillation composition comprising a material of the following structural formula:

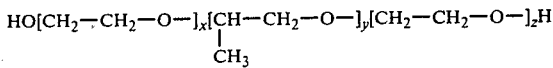

in which y is from about 18 to about 50 and x and z are such that the total [CH$_2$—CH$_2$—O] content is from about 10% to 30% by weight of the molecule.

9. The method of claim 7, in which y and y' are from about 18 to about 50, and the total [CH$_2$—CH$_2$—O] contents are from about 10% to about 30% of the total weight in both molecules.

10. The method of claim 9 in which y is from about 30 to 56 and y' is from about 15 to 30.

11. The method of claim 10 in which y is about 35 and y' is about 20.

* * * * *

UNITED STATES PATENT AND TRADEMARK OFFICE
CERTIFICATE OF CORRECTION

PATENT NO. : 4,124,527
DATED : November 7, 1978
INVENTOR(S) : Joel M. Kauffman

It is certified that error appears in the above-identified patent and that said Letters Patent are hereby corrected as shown below:

Column 2, line 19, change "abosrbs" to ---absorbs---
Column 5, line 34, change "copolmers" to ---copolymers---
Column 9, line 60, change "copolmer to ---copolymer---
Column 10, in Table I, change "Example III" (second
   occurrence) to ---Example IV---
Column 15, claim 1, in the formula:

$$HO-[CH_2-CH_2-O]_x-\underset{CH_3}{CH}-CH_2-O]_y-]CH_2CH_2-O]_z-H$$

should be:

$$HO-[CH_2-CH_2-O]_x-[\underset{CH_3}{CH}-CH_2-O]_y-[CH_2CH_2-O]_z-H$$

Signed and Sealed this

Twentieth Day of March 1979

[SEAL]

Attest:

RUTH C. MASON
Attesting Officer

DONALD W. BANNER
Commissioner of Patents and Trademarks